Aug. 17, 1937. C. A. HUTTINGER 2,089,962
PROCESS OF AND APPARATUS FOR TREATING FINE FILAMENTOUS THREADS
Filed May 5, 1934 8 Sheets-Sheet 1
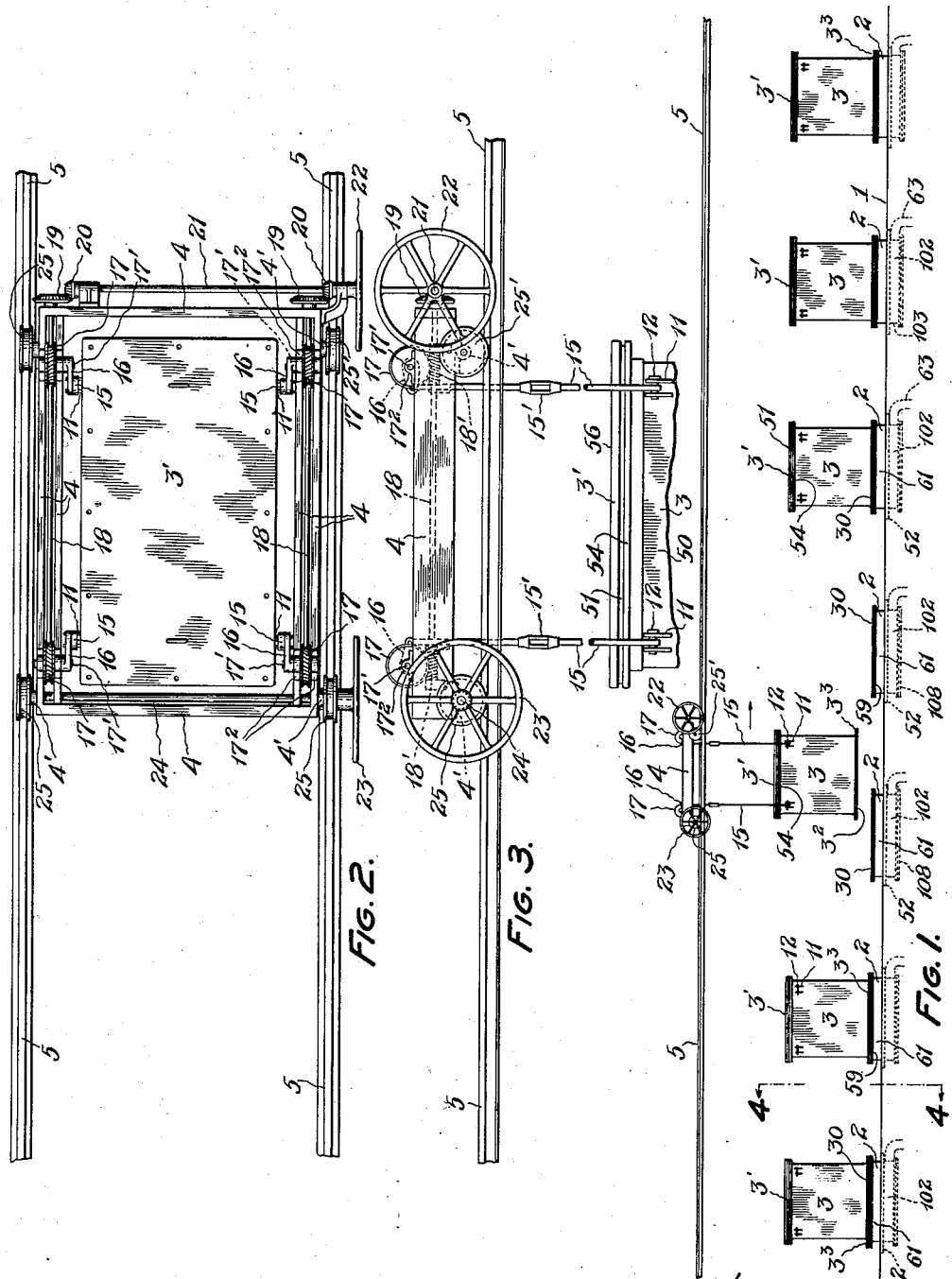
INVENTOR:
CHARLES A. HUTTINGER
By Saywell and Wesseler
ATTORNEYS

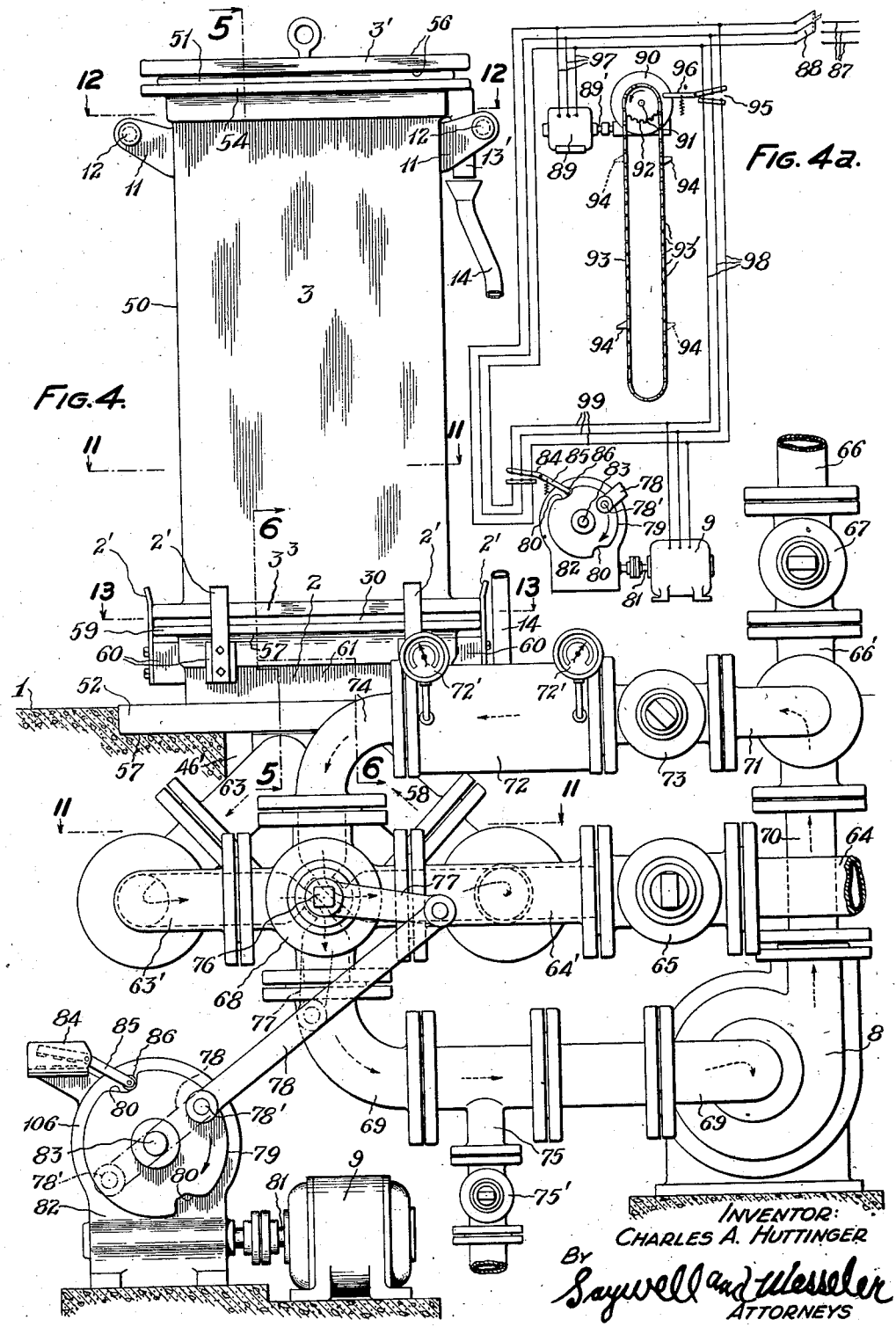

Aug. 17, 1937.   C. A. HUTTINGER   2,089,962
PROCESS OF AND APPARATUS FOR TREATING FINE FILAMENTOUS THREADS
Filed May 5, 1934   8 Sheets-Sheet 3

INVENTOR:
CHARLES A. HUTTINGER
BY Saywell and Wesseler
ATTORNEYS

Aug. 17, 1937. C. A. HUTTINGER 2,089,962
PROCESS OF AND APPARATUS FOR TREATING FINE FILAMENTOUS THREADS
Filed May 5, 1934  8 Sheets-Sheet 4
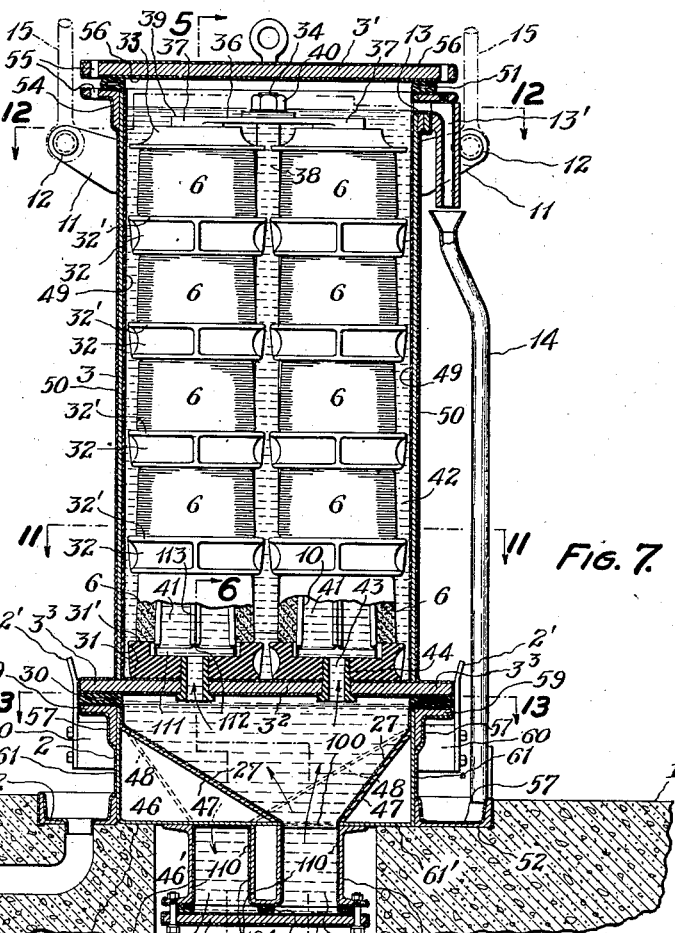
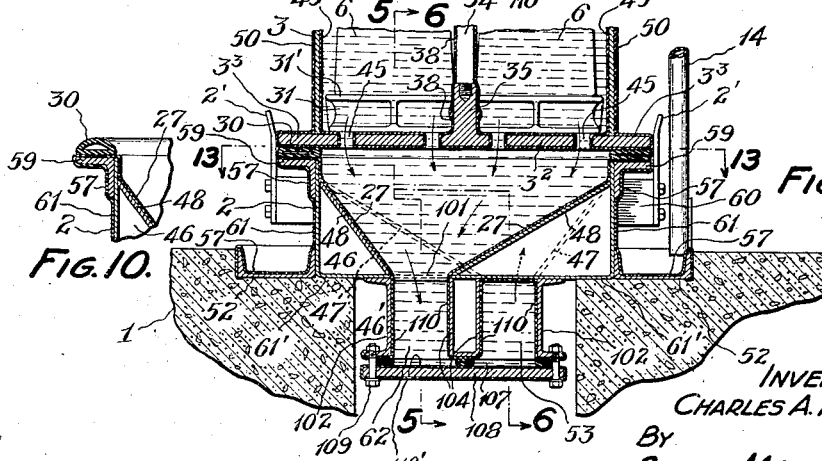
INVENTOR:
CHARLES A. HUTTINGER
BY
Saywell and Wesseler
ATTORNEYS

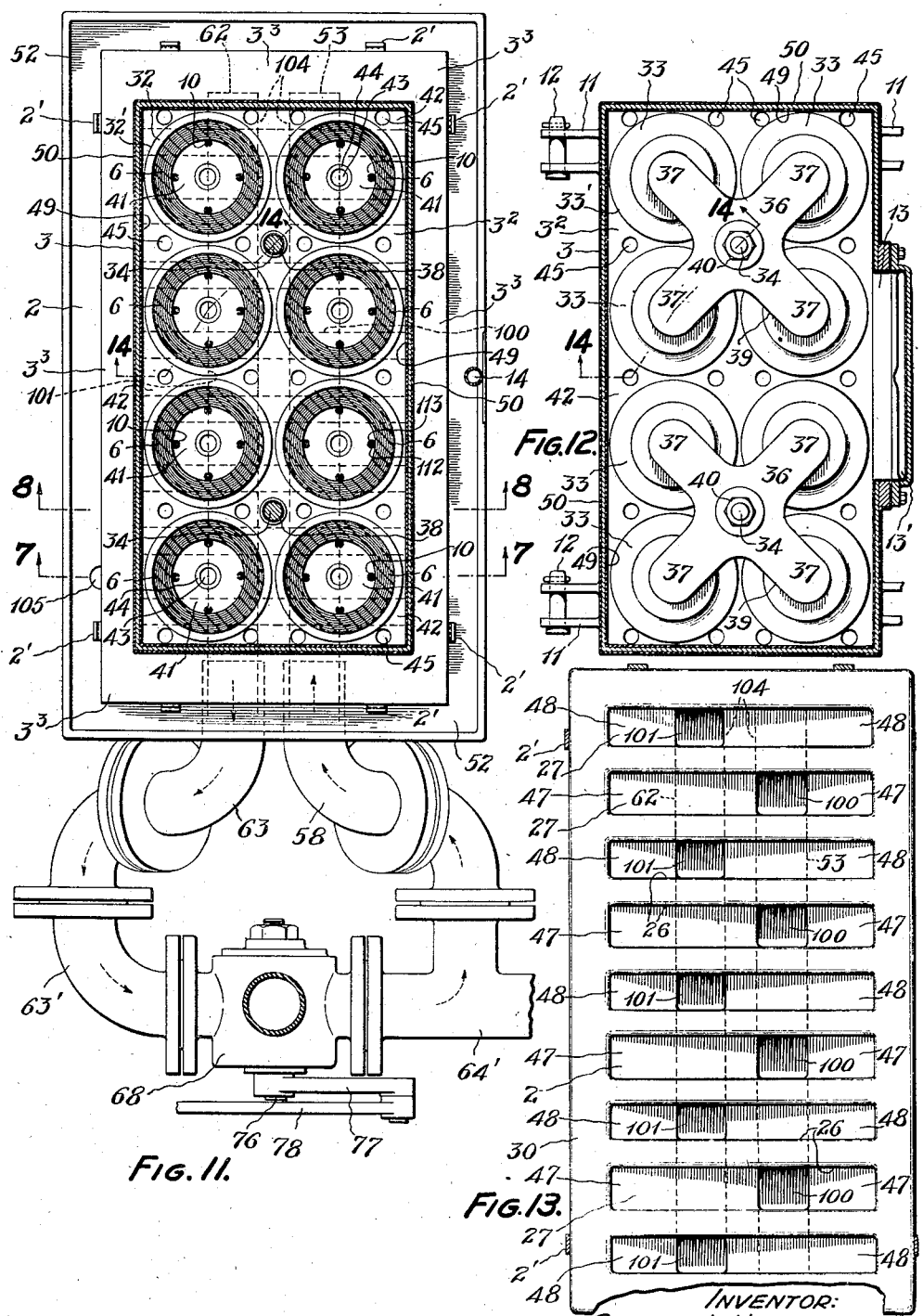

Aug. 17, 1937.  C. A. HUTTINGER  2,089,962
PROCESS OF AND APPARATUS FOR TREATING FINE FILAMENTOUS THREADS
Filed May 5, 1934  8 Sheets-Sheet 6
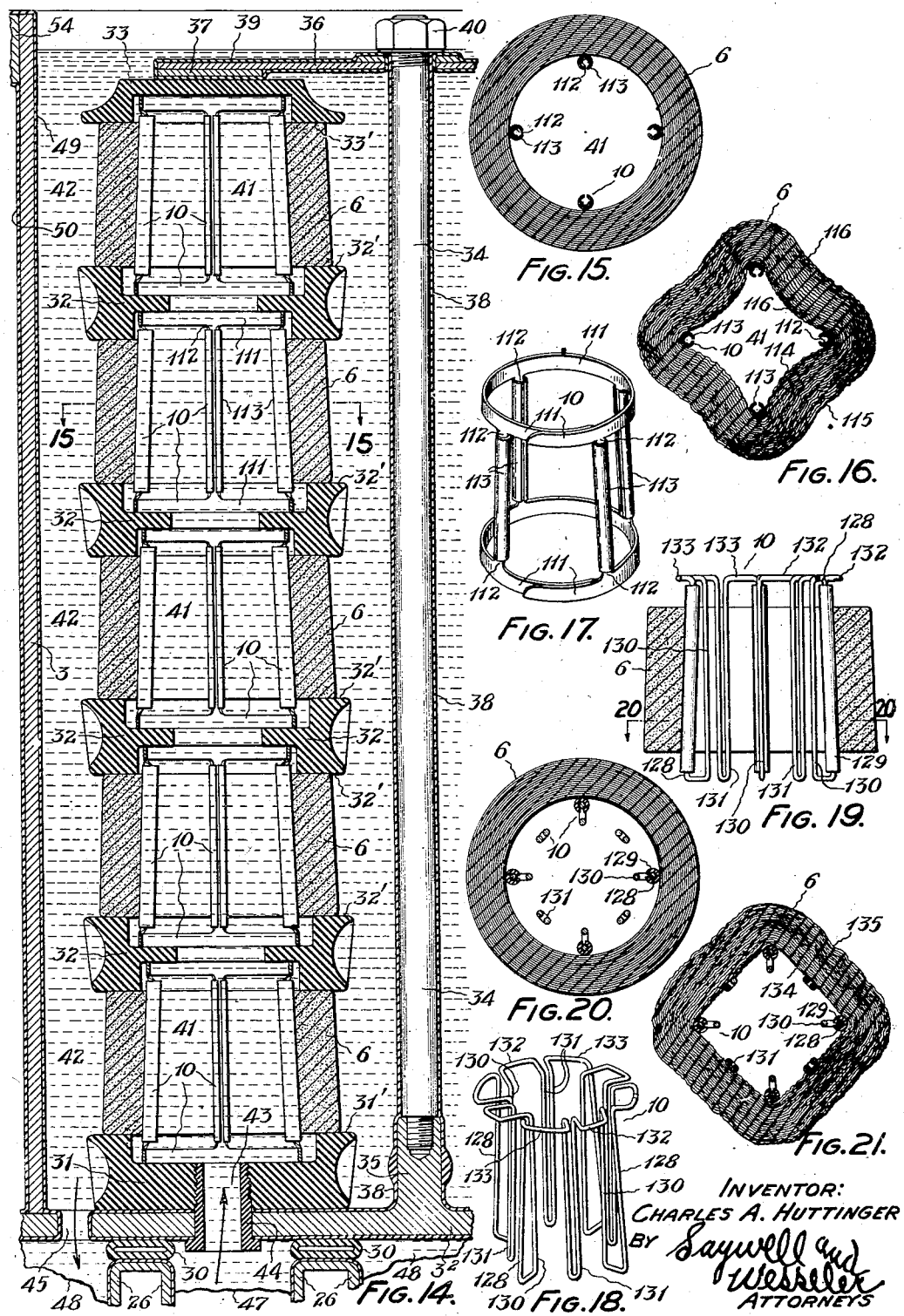
INVENTOR:
CHARLES A. HUTTINGER
BY Saywell and Wessler
ATTORNEYS

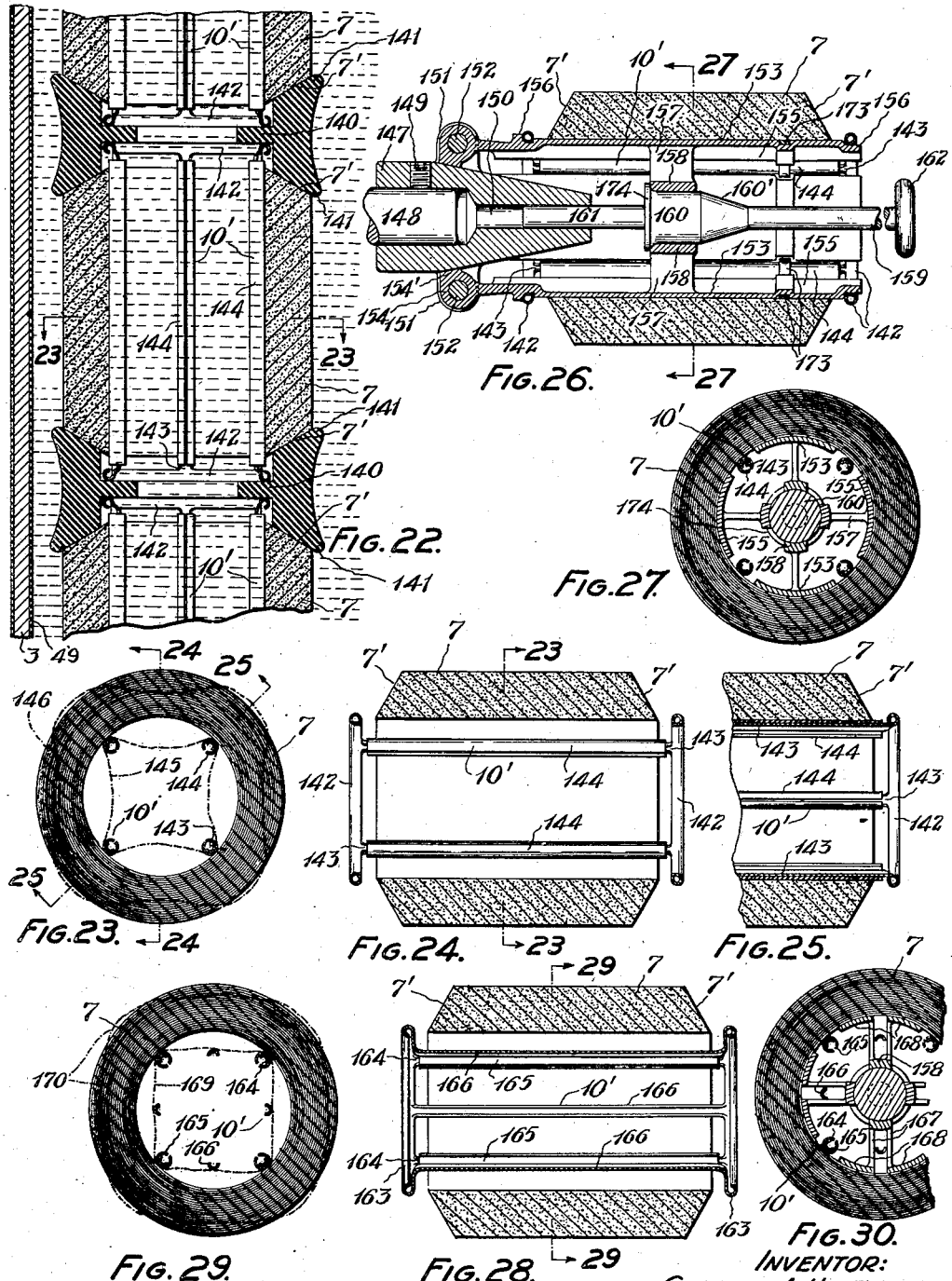

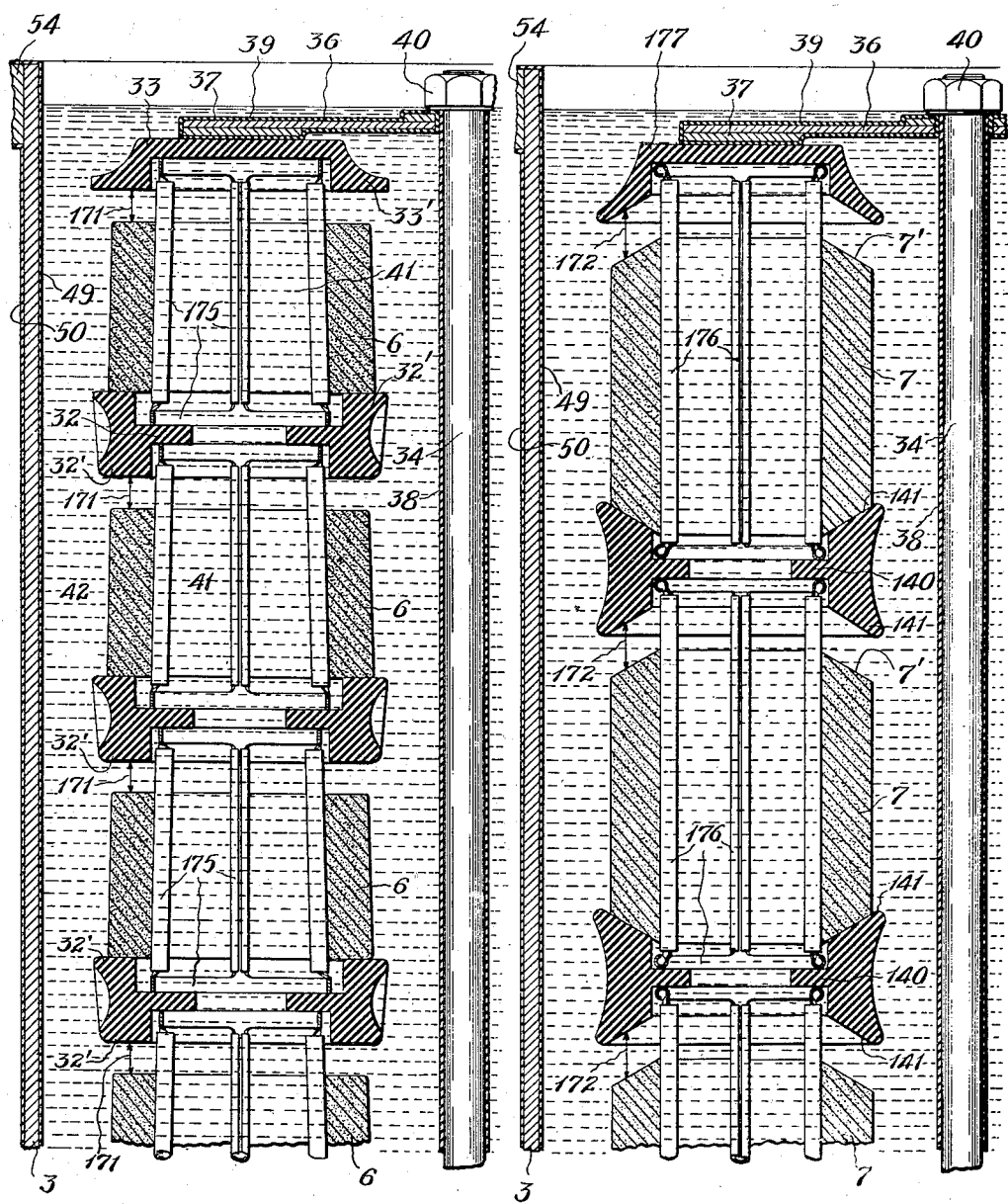

Patented Aug. 17, 1937

2,089,962

UNITED STATES PATENT OFFICE 2,089,962

PROCESS OF AND APPARATUS FOR TREATING FINE FILAMENTOUS THREADS

Charles A. Huttinger, Lakewood, Ohio, assignor to Acme Rayon Corporation, Cleveland, Ohio, a corporation of Ohio Application May 5, 1934, Serial No. 724,113

11 Claims. (Cl. 18—8)

My invention particularly relates to an improved method for treating rayon in package form, such as cakes, wound spools, wound bobbins, and other tubular packages or symmetrical or balanced formation, after the rayon thread has been collected in such form on spinning machines from the precipitating bath in which the rayon filaments are set up. The rayon thread as so collected comprises a comparatively large number of filaments which are twisted as some forms of packages are being collected and are collected untwisted in other forms of packages. The invention also includes improved apparatus for treating package rayon including new and improved forms of package supports, such as cake inserts, and bobbins. Claims to the new forms of package supports are not included in this application.

The treatments to which the rayon package is subjected by my improved process and apparatus are those to which the rayon is necessarily subjected, before the precipitated and package-collected thread can be considered a final product ready for the market, such as various water washings, desulphurizing, bleaching, oiling, sizing, dyeing, drying, and other purifying and finishing operations.

For purposes of illustration, I shall describe my invention in the following specification, by reference to the accompanying drawings, as applied to a water washing treatment of the thread package, the forms of illustrative rayon packages being cakes and wound bobbins. In the water washing operation the acids and salts and extraneous matters are washed out of the cake or wound bobbin. However, the other treatments mentioned are effected by the same process and in the same apparatus, and in fact, all of the treatments of the thread package can be effected in the proper sequence in the same apparatus by a suitable arrangement of liquid-supply sources, pipes, valves, drains, etc., and by the conveyance, in proper sequence, of the treatment casings, in which a plurality of the packages are mounted, as hereinafter fully described, to and from the different stations at which the respective treatments are effected. Some of the ways of applying my improved process deal with the cakes and wound bobbins in their freshly spun condition and in a tender state, such as the gel state. It is not necessary to age or harden the collected cake or wound bobbin beyond the period in which it is fully set up, before commencing the treatment thereof by my improved process and apparatus, but the processing thereof in its freshly spun state can be commenced immediately after it has been collected from the precipitating bath and when the entire thread has been fully set up.

The objects of the invention are to effect the aforesaid treatments in a thorough manner, and economically, and without breaking or otherwise materially damaging the thread, while at the same time preventing the creation of any immobile areas in any portion of the package, or any unequal strains in different portions of the package, either during these treatments or during the drying of the package, which immobile areas and strains would result in a non-uniform dyeing thereof. My invention obviates the creation of immobile areas and strained conditions in the package and thus induces even shrinkage during the drying thereof. This even shrinkage is obtained by even one drying operation, thus obviating the necessity of rewetting the package and again drying in order to improve the uniform shrinkage condition. Furthermore, if some portions of the package dry in an immobile condition, or have strains set up therein by some of the purifying and drying operations antecedent to the dyeing thereof, different portions of the thread in the package then have different reflective indexes and give different color reactions or have a barred effect when the thread is dyed, resulting in a thread of non-uniform color.

Primarily, the process consists in loosening up the package, when treating the same in its initial collected form, so as to provide for all parts of the package their respective natural scopes of free play, relative to other parts of the package, thus effecting a natural alteration of the relative positions of all of the thread strands comprising the package. This is done without injuriously disarranging the thread or the strands thereof, so that the package may be dried in the treated package form, preliminary to the sale thereof for the market, or to the rewinding thereof into some other form of package for such sale, without inducing strains or an immobile condition in any portion of the package which would result in a non-uniform dyeing or barred effect. The purification and other treatments of the package are carried out without unduly impairing the tenacity and elasticity of the thread required for later handling and processing or for use, and without setting up local tension areas or non-uniform strains.

Essentially, my improved process consists in pulsating the package body by means of the treating liquid on the openings of perforated supports upon which the package is mounted and while the latter is free to move to a predetermined extent in, and under the pressure of, the treating liquid. The package is so mounted that different portions thereof move or pulsate differently under the action of the treating liquid; specifically, spaced transverse portions of the package react differently than the package portions intermediate said spaced transverse portions. While the package is being treated, water and chemicals are being removed, and hence the thread diameter is being decreased and thus is permitted greater freedom for the desired pulsating movements. The initial rayon packages which I illustrate, and the treatment of which is shown, described and claimed, are of symmetrical annular formation having inner and outer side surfaces or faces, and end faces. I periodically reverse the direction of flow of the treating liquid and thus pass it alternately in both directions through the package body, from inside out and outside in, or at least the treating liquid penetrates the package body and tends to pass therethrough alternately in both directions. The treating liquid is passed through the package body under any desired practicable pressure so as thereby to control to an extent the character of the treatment and the character and amount of package movement and pulsation, and the pressure may be maintained uniform or may be varied. Although the range of practicable liquid pressures is considerable, particularly by reason of the different effects of different treating liquids, I preferably use a nominal pressure of from one to two pounds. The liquid pressures within the practicable pressure range are not great enough to materially expand or compress the split inserts upon which the cake packages are mounted, so that these inserts provide a substantially rigid support of constant dimensions during the liquid treatment. While the treating liquid passes from without the tubular package through the body thereof and into the interior of the package, my improved process and apparatus provide for a deforming of the package by permitting portions thereof to move inwardly, preferably a predetermined distance inwardly, under the pressure of the treating liquid, so as to loosen up the package to a degree and permit the altering of the positions of the strands or different portions of the thread comprising the package. I provide in some instances, particularly when treating a freshly spun package in a tender state, for moving the package to a predetermined degree also in directions other than radially, by providing a space within which the package may longitudinally elongate. In my improved method of package treatment, the package is surrounded by the treating liquid and the latter acts as a lubricant for the thread obviating injury to the latter.

It is well understood by those skilled in the art that rayon packages of the character herein described are spun so that the strands thereof substantially prevent any enlargement of the package perimeter, so that the pressure of treating liquid from within the package outwardly, under any pressures practicably usable, does not bulge or deform the package outwardly so as to increase its perimeter to any material extent. However, those portions of the package which are not moved inwardly by liquid passed inwardly of the package body are adjusted somewhat outwardly during such treatment, as clearly shown in the accompanying drawings and as will hereinafter be fully described.

My invention comprises an entirely new method of rayon-package liquid treatment in that the treating liquid is passed alternately in both directions through the package body while the inner face of the tubular package is not entirely confined so that parts of the package are free to move and relatively adjust themselves under the influence of the treating liquid, with a corresponding natural adjustment of all other parts of the package.

The improved process then consists essentially in pulsating the rayon package laterally to and fro by the treating liquid, and on package-support openings, and within an area having a perimeter not substantially greater than the original package perimeter, with or without a limited amount of longitudinal expansion, and is carried out in the manner herein fully explained, by reference both to cake and wound bobbin packages, and by the use of improved apparatus shown in illustrative forms in the accompanying drawings.

The annexed drawings and the following description set forth in detail certain means exemplifying my improved apparatus and certain steps illustrating my improved process, the disclosed drawings and description setting forth in detail, however, only a few of the various series of steps by which my improved process may be carried out and only a few of the various forms of apparatus in which the principle of my improved apparatus may be embodied.

In said annexed drawings:

Figure 1 is a diagrammatic side view of a line of rayon-package treatment casings and transfer mechanism therefor by means of which the casings may be conveyed from one treating station to another, a foundation and fixed bases for the treating stations also being shown, the view including a showing of one casing being transferred from one base upon which a treatment has been effected to a subsequent base where another treatment will be effected;

Figure 2 is a plan view of a treatment casing, and of lifting, and overhead track and carriage, mechanisms adapted to transfer the casings and their contained rayon packages from one treating station to another station;

Figure 3 is a broken side view of the mechanisms shown in Figure 2 and a fragmentary side view of a treatment casing to which the lifting mechanism is secured;

Figure 5:
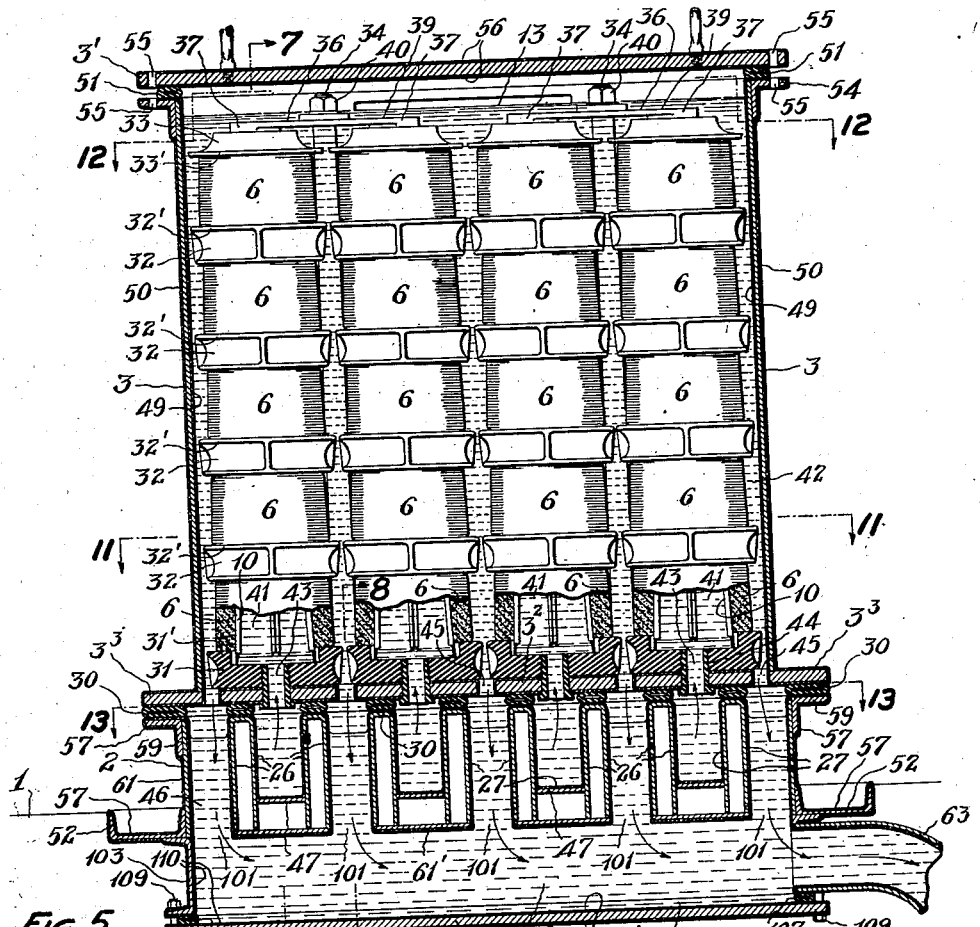
Figure 6:
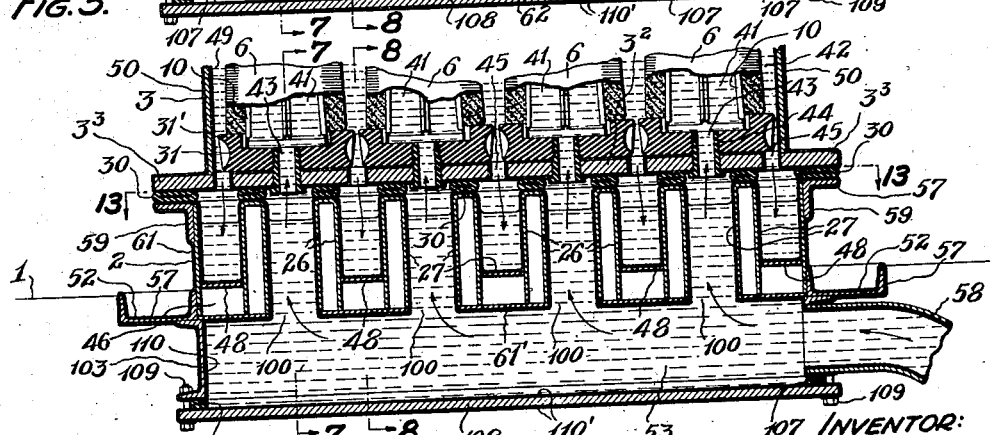

Figure 4 is an end view of a unit for effecting a single treatment upon a plurality of rayon packages contained in a treatment casing, the view being taken from the plane indicated by the line 4—4, Figure 1, there being shown in dot-and-dash lines a position of certain mechanism for reversing the direction of flow of the treating liquid, so that the flow-direction would be opposite to that shown by the arrows in the figure;

Figure 4a is a diagrammatic showing of a wiring arrangement and associated means serving automatically to time and actuate the mechanism adapted to reverse the direction of liquid flow, including means for varying the time intervals between reversals;

Figure 5 is a vertical longitudinal section, taken through the movable treatment casing shown in Figure 4 and the fixed base upon which the same is mounted, the planes of section being indicated by the line 5—5, Figures 4, 7, and 8;

Figure 6 is a fragmentary vertical longitudinal section through the lower part of the movable casing and the fixed base upon which the same is mounted, the section being taken in the planes indicated by the line 6—6, Figures 4, 7, and 8.

Figure 7 is a vertical transverse section, taken in the plane indicated by the line 7—7, Figures 5, 6, and 11;

Figure 8 is a fragmentary vertical transverse section, taken in the plane indicated by the line 8—8, Figures 5, 6, and 11;

Figure 9 is a fragmentary side elevation of the top of a treatment casing, showing supporting and carrying ears, and a removable pin, serving to attach dependent lifting rods to the casing, a fragmentary portion of one of said rods being shown in broken lines;

Figure 10 is a fragmentary vertical transverse section of the top of a fixed base for the movable treatment casings, showing the form of a certain pneumatic gasket mounted upon the top of the base when no casing is mounted upon the base;

Figure 11 is a plan section, taken on the planes indicated by the lines 11—11, Figures 4, 5, and 7;

Figure 12 is a plan section, taken on the planes indicated by the line 12—12, Figures 4, 5, and 7;

Figure 13 is a plan view of one of the fixed bases for the treatment casings, the view being taken from the plane indicated by the line 13—13, Figures 4, 5, 6, 7, and 8;

Figure 14 is an enlarged vertical section of a fragmentary portion of a movable treatment casing, showing one vertical tier of rayon cakes mounted therein, the view being taken in the planes indicated by the line 14—14, Figures 11 and 12;

Figure 15 is a plan section of one of the rayon cakes and a contained rod-and-band rubber-covered support or insert, the plane of section being indicated by the line 15—15, Figure 14, and the cake being shown in that shape in which it is spun, or, if it has been deformed inwardly by previous liquid treatment, in which it tends to reestablish itself, when the pressure of the treating liquid is from the inside of the cake towards the outside;

Figure 16 is a view similar to Figure 15, but indicating the shapes and positions which the cake and its constituent portions assume, or tend to assume, when the liquid pressure is from the outside of the cake towards the inside;

Figure 17 is a perspective view of the rod-and-band insert or support contained within the cake shown in the preceding three views;

Figure 18 is a perspective view of one modified form of insert or support for the cake, this insert being made of wire and provided with stops intermediate of, and relatively interiorly of, four fingers which contact the inner wall of the cake. The rubber covering which incases the finger contacts has been omitted from this view for the sake of clearness.

Figure 19 is a vertical section through a rayon cake mounted on an insert such as shown in Figure 18, this view showing that the insert wires which permanently contact the cake are covered with rubber;

Figure 20 is a plan section, taken on the plane indicated by the line 20—20, Figure 19, and showing the shape in which the cake is spun, or, if it has been deformed inwardly by previous liquid treatment, in which it tends to reestablish itself, when the pressure of the treating liquid is from within outwardly;

Figure 21 is a view similar to Figure 20, but showing the change in shape assumed by the cake, or which it tends to assume, when the liquid pressure is from without inwardly;

Figure 22 is a fragmentary vertical section similar to a portion of Figure 14, but showing a wound bobbin type of rayon package and a bobbin support for rayon packages of the wound bobbin type;

Figure 23 is a plan section, taken on the plane indicated by the line 23—23, Figures 22 and 24, the shape in which the wound bobbin is spun, or, if it has been deformed inwardly by previous liquid treatment, in which it tends to reestablish itself, when the flow of treating liquid is from within outwardly, being shown in full lines, and the shape assumed by the wound bobbin package, or which it tends to assume, when the flow of treating liquid is from without inwardly, being suggested by dotted lines;

Figure 24 is a vertical axial section, taken in the plane indicated by the line 24—24, Figure 23;

Figure 25 is a fragmentary axial section, taken in the plane indicated by the line 25—25, Figure 23;

Figure 26 is a fragmentary axial section of the bobbin-supporting-and-rotating portion of a spindle of a spinning machine provided with a perforated bobbin and a bobbin attachment, both of which embody my improvements, the attachment serving to hold the thread circular as it is being collected from the precipitating bath and thus insure cylindrical inner and outer surfaces of the collected and wound bobbin. Thus a regularly annular package is gathered even if the package being gathered is supported only at spaced points by the bobbin or support, or, in other words, is being gathered on a perforated bobbin having comparatively large windows or openings.

Figure 27 is a cross-section, taken in the plane indicated by the line 27—27, Figure 26;

Figure 28 is an axial section, similar to Figure 24, but showing a wound-bobbin support provided with longitudinal stops to limit the inward movement of the walls of the wound bobbin package when subjected to the pressure of a treating liquid flowing inwardly of the package;

Figure 29 is a cross-section, taken in the plane indicated by the line 29—29, Figure 28, the shape in which the wound bobbin package is spun, or, if it has been deformed inwardly by previous liquid treatment, in which it tends to reestablish itself, when the flow of treating liquid is from within outwardly, being shown in full lines, and the shape assumed by the wound bobbin package, or which it tends to assume, when the flow of treating liquid is from without inwardly, being suggested by dotted lines;

Figure 30 is a view similar to Figure 27, but showing necessarily modified shell portions for the bobbin attachment, when the bobbin is provided with stops such as shown in Figures 28 and 29;

Figure 31 is a fragmentary vertical section, similar to Figure 14, of a vertical tier of rayon cakes in a treatment casing, the cakes being in a freshly spun or "gel" state, not aged or hardened beyond the period in which they are fully set up, the cakes having been subjected as yet to no purifying operations, the figure showing spaces between the tops of the respective cakes and the adjacently upper spacer flanges, whereby the cakes during the liquid treatment can elongate longitudinally; and Figure 32 is a fragmentary vertical section, similar to Figure 22, of a vertical tier of wound rayon bobbins in a freshly spun or "gel" state, not aged or hardened beyond the period in which they are fully set up, the wound bobbins not having been subjected as yet to any purifying operations, and being spaced at the top from the respectively adjacently upper spacer flanges so as to permit the wound bobbins during the liquid treatment to elongate longitudinally.

Referring to the annexed drawings in which the same parts are indicated by the same respective numbers in the several views, and particularly referring to Figures 1, 2, and 3, I build a plurality of fixed supporting bases 2 upon a working floor 1, the number of such bases 2 being desirably, but not necessarily, substantially equal to the number of purifying and other processing operations to which a rayon package may be subjected, these bases 2 forming stations at which the several purifying and other processing operations may be effected in sequence, upon a plurality of rayon packages suitably mounted in movable treatment casings 3. The organization of the apparatus is such that the same kind of treatment is given at any one station to every "batch" or treatment-casing-load of packages that is treated at that station. The casings 3 are provided with covers 3' and are formed with base portions 3² having outwardly-extended flanges 3³ which register within the space defined by upwardly-extended and outwardly-curved spaced clips 2' secured to blocks 60 supported by the supporting bases 2, Figure 4. A treatment casing 3 is thus adapted to be rested by its base portions 3² upon a supporting base 2 in a predetermined position for effecting an operation upon the rayon packages mounted in the treatment casing 3. It is not necessary positively to fasten the treatment casing 3 to the fixed base 2 inasmuch as the weight of the casing and its contained load is sufficient in itself to seal the joint between the casing and base against the pressure of treating liquid ordinarily used, particularly in combination with a pneumatic gasket 30 hereinafter fully described.

Referring particularly to Figures 8 and 10, it will be noted what are the conditions of the gasket 30, both when the treatment casing 3 is mounted upon the working base 2 and when no treatment casing is mounted on the base 2. The gasket 30 serves as a resilient top for the base 2 upon which the treatment casing 3 is supported, the outer perimeter of the gasket 30 actually being positioned upon angles 59 which are secured to the outer surface of a tank-like member 61.

It is not necessary to fasten the cover 3' to the treatment casing 3 but if it is desired so to do, I provide angles 54 and the cover 3' with bolt holes 55, Figures 5 and 7, by means of which the securing of the cover 3' may be effected. The working of my improved process does not necessarily require the use of any cover for the treatment casing 3, so the cover 3' may be dispensed with, if desired, but its use is of advantage in preventing entrance of contaminating material into the treatment casing 3.

A treatment casing 3 is transported, between successive operations upon the packages therein contained, from one fixed supporting base 2 to another base 2 by a transfer carriage 4 which can be rolled upon an overhead track 5, Figures 1, 2 and 3. This mechanism will now be described in detail.

A plurality of pairs of ears 11 are formed upon the outer sides of the casings 3 within each pair of which is removably mounted a pin 12 to which is secured the lower end of a depending lifting rod 15 provided with a turnbuckle 15' to permit the adjusting of the length thereof. The upper end of the rod 15 is secured to the free end of a crank arm 16 which in turn is secured to a shaft 17' of a worm wheel 17. The latter is mounted in a pair of brackets 17² supported by the carriage 4 and engages a worm 18' formed upon the end of a longitudinal shaft 18 mounted in the transfer carriage 4. There are two of the shafts 18, one adjacently interior of each side of the carriage 4, and each shaft has a worm portion 18' adjacent each end thereof. There is further secured to one end of each of the shafts 18 a bevel gear 19 which engages a bevel pinion 20 secured to a cross shaft 21 supported by the carriage 4 exteriorly of one end thereof. Secured to an extending end of the shaft 21 is a hand wheel 22 which, it is evident, upon being actuated, will serve through the described transmission members to lift or lower the rods 15 and hence to lift or lower the treatment casing 3 from or onto the base 2, as clearly shown with reference to one of the treatment casings 3 to be seen in Figure 1. When lowering the casing 3 onto the base 2, the clips 2', Figures 4 and 11, serve properly to align the casing 3.

For propelling the rolling transfer carriage 4 along the tracks 5 and thus transferring a treatment casing 3 from one base 2 to another base, I provide the following means: The carriage 4 is mounted upon bearing brackets 4' which are supported by two opposed pairs of rollers 25 and 25' engaging the tracks 5. A cross shaft 24 mounted in the side frame members of the carriage 4 adjacent one end of the latter is secured to the pair of rollers 25 and is provided with a hand wheel 23 serving to turn the shaft 24 and hence the pair of rollers 25. The rollers 25' are free but engage the tracks 5 and are located adjacent that end of the carriage 4 opposite to the end where the positively driven rollers 25 are located.

The entire lifting and transfer mechanisms just described are located exteriorly of the vertical projections of all portions of the casing 3, as shown in Figure 2, so that there is no danger of any dirt or other refuse from the lifting and transfer mechanisms falling into the treatment casing 3 and contaminating the contents thereof.

I illustrate my invention by the treatment of rayon packages both in the form of cakes 6, Figure 14, and in the form of wound spools or wound bobbins 7, Figure 22. The treating liquid, water, for instance, is circulated through the casings 3, and hence through the rayon cakes and wound bobbins, by any suitable means, such as a centrifugal pump 8, Figure 4, which is reversed at desired intervals either by hand or by timed automatically-operated means, Figure 4a, all of which is herein described in detail. Several tiers of vertically-aligned and connected rayon packages are mounted in a treatment casing 3, and treated simultaneously, as shown in Figures 5, 6, 7, 8, 11 and 12.

A part of my improved apparatus includes improved inserts or supports for the cakes 6 and improved bobbins or supports for the wound spools or wound bobbins 7. The inserts for the cakes are of truncated conical formation and conform to the forms of the cakes which are mounted upon them. All inserts and bobbins are perforated and form internal supports for the cakes and wound bobbins. The perforations of the inserts and bobbins, i. e., the openings on which the pulsating of the cakes and wound bobbins is effected, are in the nature of open windows preferably, but not necessarily, arranged lengthwise of the inserts and bobbins. The inserts for the cakes 6 are shown in a general way by inserts 10, Figure 14, and the bobbins for the wound spools and wound bobbins by the bobbins 10', Figure 22, various improved forms of these inserts and bobbins forming part of my invention and being shown in the accompanying drawings, and herein described in detail. The open windows of the inserts and bobbins are large enough in area to permit materially large portions of the rayon package to pulsate therethrough under the action of the treating liquid. Thus the inserts and bobbins are of skeleton formation and do not interpose material obstruction to the passage of treating liquid therethrough. This construction assists in speeding up the treating operations. Claims to the improved forms of inserts and bobbins per se are contained in another application Serial No. 724,114 filed concurrently herewith.

Referring to Figure 14, the lowermost cake 6 in any vertical tier of cakes is mounted in the treatment casing 3 upon an annular upwardly-extended flange 31' of an annular hard rubber base member 31, and between each adjacent two cakes 6 of any tier is provided an annular hard rubber abutment or spacing member 32 having upper and lower annular flanges 32' with which the ends of the cakes 6 contact in the form of apparatus shown in Figure 14. The top of the topmost cake of a tier is surmounted by a hard rubber cap 33 closed at the top and having a downwardly-extended flange 33' which the cake contacts. The distance between the body portions of adjacent spacers 32, or between such a spacer and the cake base 31, or between such a spacer and the cap 33, is defined by the height of the cake insert or support 10. Several such tiers of cakes are mounted in the treatment casing 3, eight such tiers in the form of apparatus shown, four tiers longitudinally of the casing 3, and two tiers transversely thereof, Figures 5 and 7, the two sets of two transverse tiers at each end of the casing 3 being locked together, and also locked tightly in a vertical direction, by a spider 36 whose four arms 37 are formed into pads which are fastened down upon the tops of the four caps 33 by means of a nut 40 which engages the top of a rod 34 passing through the body of the spider 36 and whose bottom end is engaged with a boss 35 extended upwardly from the base 3² of the treatment casing 3. There are two of the spiders 36 and associated mechanisms.

The flanges of the bases 31, spacers 32, and caps 33 extend laterally beyond the outer face of the rayon cakes 6 and are substantially equal in diameter to one-half the inside width of the treatment casing 3, as will appear from Figures 7, 11, and 12. Actually, these flanges are slightly less in diameter than one-half the width of the treatment casing 3, approximately one-eighth (⅛) inch less in diameter, so as to permit the convenient assembling of the tiers of cakes in the treatment casing, but the flanges are so nearly in diameter one-half the width of the treatment casing 3 that the mere assembling of the cakes and bases, spacers, and caps in the treatment casing serves automatically to provide for satisfactorily perfect vertical alignment of the cakes in each tier. Within similar limitations, as shown in Figures 5, 11, and 12, the inside length of the treatment casing 3 is four times the diameter of the flanges 31', 32', and 33'. As clearly seen in Figure 14, the interiors of vertically-aligned cakes 6 are in communication through the central openings of the annular spacers 32 so that all the cakes in any one vertical tier form a single interior chamber. The vertical chambers inside the respective tiers of cakes 6 and spacers 32 are indicated by the numbers "41", and the irregularly-shaped chamber exteriorly of the cakes, but within the treatment casing 3, is indicated by the number "42".

It is evident that if means are provided for circulating treating liquid within the treatment casings 3 in such a manner as to cause the same when passing through the treatment casing to flow from the chambers 41 to the chamber 42, or vice versa, such liquid will pass through and treat the threads comprising the bodies of the cakes 6. My invention contemplates such passing of the treating liquid through the cake bodies alternately in both directions whereby a pulsating upon the insert openings of the cake bodies and their constituent threads is induced so as to loosen up the threads being treated and thus permit the different portions of each cake body to alter their relative positions according to their respective tendencies and without strain. Then, during later drying of the cake, a uniform shrinkage of all parts of the cake body is obtained and no strain is therein set up or any immobile areas therein produced, so that the reflective indexes of all parts of the thread comprising the cake are the same, and hence the whole cake body can be uniformly dyed. Furthermore, the cake body is free to move laterally to and fro within predetermined limits during the liquid treatment so that the different portions thereof naturally assume their relative positions without tension.

Means will be hereinafter described in detail for recirculating treating liquid through the casings 3, and for reversing the direction of liquid flow, and for causing the pulsating and moving of the rayon packages.

The base 3² of the treatment casing 3 is formed with a series of openings through which pass hard rubber bushings 44 whose upper ends are threaded into the cake bases 31 and thus fasten the latter to the base 3². The openings 43 in the bushings 44 respectively communicate directly with the chambers 41 formed within the interiors of the vertical tiers of cakes 6 and their associated spacers 32. The base 3² of the treatment casing 3 is also formed with a second series of openings 45 therethrough which communicate with the chamber 42 in the casing 3, which chamber 42 is exteriorly of the cakes 6. The circulating treating fluid passes into and out of the treatment casing 3 through the openings 43 and 45, alternately in both directions. The large number of openings 43 and 45 provide means for quickly and thoroughly draining the treatment casing 3 of a treating liquid after one treating operation has been completed and before transporting the casing and its contained load of cakes to another fixed base 2 for a subsequent treatment.

In the working floor 1, Figures 5, 6, 7 and 8, I form a pit 46 lined with a pan-shaped metal wall 61 whose base 61' is formed with two longitudinal staggered series of openings 100 and 101, Figure 13. In a smaller and adjacently lower pit 46' are located longitudinal vertical channels 102 and an end channel 103 secured by their upper flanges to the base 61' exteriorly of the openings 100 and 101, which channels define an area which includes two side chambers 53 and 62, respectively, which are completely separated by a vertical longitudinal partition comprised of spaced plates 104. The chambers 53 and 62 communicate with the chamber of the pan 61 through the openings 100 and 101, respectively. The channels 102 which define the chambers 53 and 62 are secured by means of bolts 109 to a base plate 108, Figure 8, gaskets 107 being disposed between the channels 102 and partitions 104, and said base plate 108. To the pan 61 I secure alternating downwardly and inwardly inclined and converging pairs of transverse plates 47 and 48, respectively, of which the adjacent pairs are separated by vertical transverse partitions 26, thus forming alternate series of transverse conduits which respectively communicate with the ports 43, and with the ports 45. It will also be noted in Figures 7, 8 and 13 that the plates 47 and 48 are so respectively inclined that the opening between the bottoms of a pair of plates 47 registers with an opening 100 into the side chamber 53 and that an opening between the bottoms of the plates 48 registers with an opening 101 into the opposite side chamber 62. The side chamber 53 communicates at its open end with an exterior pipe 58, and the opposite side chamber 62 communicates with an exterior pipe 63, Figures 5, 6 and 11. These pipes 58 and 63 form the inlet and outlet, respectively, or vice versa, into and from the fixed base 2 for the treating liquid which is recirculated through the treatment casing 3. As clearly shown in Figure 4, the pipe 58 communicates with a pipe 64 through the medium of a T 64', the pipe 64 being controlled by a cock 65 and communicating with a source of treating liquid supply (not shown). This pipe 64 is utilized, as desired, to supply treating liquid to or withdraw same from the system when the treating apparatus is in operation.

All parts of the apparatus subject to corrosion, or capable of contaminating the treating liquid and/or the rayon packages, are covered by non-corrosive material, or may be made of non-corrosive material. These protective means include the rubber covering 27 for the plates 47 and 48 and the partitions 26, Figures 5, 6, 7, and 8; the rubber gasket 30 for the top of the base 2, which gasket serves also as a resilient base for the treatment casing 3; the rubber covering 38 for the rods 34 and the bosses 35, Figure 14; the rubber covering 39 for the spiders 36 and clamping pads 37, Figure 14; the rubber covering 50 for the exterior of the treatment casing 3, Figures 5, 7, and 14; the rubber covering 49 for the interior of the treatment casing 3; the gasket 51 between the top of the treatment casing 3 and its cover 3', Figures 4, 5, and 7, this gasket 51 serving also as a resilient base for the cover 3' and actually resting upon an angle 54 secured exteriorly of the casing 3 and flush with the top of the latter, this angle 54 being covered by the rubber covering 50 which protects the body of the casing 3; the rubber covering 56 for the casing cover 3', Figures 4, 5, and 7; the rubber covering 57 for drain channels 52 and outside angles 59, Figures 5 and 6; the gaskets 107 beneath the partitions 104 and the channels 102, Figure 8; and the rubber covering 110 for the interior of the bottom chambers 53 and 62; and the rubber covering 110' for the base plate 108, Figures 7 and 8. In lieu of using rubber or similar protective material for coatings and coverings, resistant metal for the inserts and bobbins and many other parts of my improved apparatus may be utilized.

When it is desired to initially fill the system with the treating liquid preliminarily to the treating of the cakes 6, which have been properly assembled in the treating casing 3, the cock 65 is closed and a cock 67 in a pipe line 66 is opened, which pipe line 66 also communicates with the source of treating liquid supply. The pipe 66 communicates with a pipe 70 leading to the discharge outlet of a centrifugal pump 8, with the inlet of which pump a pipe 69 communicates, the other end of the pipe 69 communicating with the chamber of a four-way valve 68, access to which four-way valve is also afforded by pipes 63', 74, and 64. The pipe 63' communicates with the conduit 63 which opens into the side chamber 62, and the pipe 64 communicates with the conduit 58 which opens into the side chamber 53. The pipe 74 communicates with a filter 72 for removing impurities and which is provided with gauges 72' to indicate the pressure of the system and, also, the condition of the filter whereby the treating liquid can be periodically standardized. The filter 72 also communicates with a pipe 71 communicating with and connected by a T 66' to the pipes 66 and 70. The cock 73 is provided in the pipe 71 and serves to throttle as desired, the treating liquid being circulated through the system. A drain pipe 75 communicates with the pipe 69 and is provided with a cock 75'.

All of the pipes and conduits just described are filled with treating liquid when the cocks 67 and 73 are opened, and the cock 65 is closed, the filling being effected by the pressure head, the treating casing 3 also being filled. This filling with the treating liquid is continued until the liquid overflows at the level 13, Figures 5 and 7, into the chamber 13' whence the overflow passes by the downpipe 14 to a catch basin 52 formed by channels located in the main floor 1 adjacently exteriorly of the pit 46, whence the overflow is discharged through a drain 105.

As soon as the overflow of liquid from the level 13 indicates that the system is full, the cock 67 is closed, and the cock 73 set at the desired throttling position. Assuming that the direction of liquid circulation which is desired through the four-way valve 68 is that indicated by the dotted-line arrows shown in Figure 4, the valve 68 is set to effect this direction of circulation and the centrifugal pump 8 is then started. The treating liquid is thus drawn from the treatment casing 3 through the ports 45, the passages defined by the plates 48, openings 101, and side chamber 62, to the pipe 63 whence it passes by pipe 63' through the four-way valve 68 to the pipe 69, thence through the pump 8, pipe 70, T 66', pipe 71, filter 72, pipe 74, four-way valve 68, T 64', conduit 58, side chamber 53, openings 100, passages defined by plates 47, and ports 43 into the chambers 41, whence it completes the cycle by passing through the bodies of the rayon cakes 6 to the exterior chamber 42. In passing from the chambers 41 inside the cake 6 to the chamber 42 outside of the cakes, the circulating liquid treats the cakes in the desired manner.

If the desired direction of liquid circulation had been opposite to that which has just been described in detail, the treating liquid would have been drawn from the treatment casing 3 through the ports 43, thence through the passages defined by the plates 47, then through the openings 100, side chamber 53, conduit 58, T 64' and into the four-way valve 68 (the plug or core of the latter being turned ninety (90) degrees from the position shown in Figure 4 to induce directions of flow therethrough in directions differing from those shown by the dotted arrows, Figure 4), pipe 69, pump 8, pipe 70, pipe 71, filter 72, pipe 74, four-way valve 68, pipe 63', side chamber 62, openings 101, ports 45, chamber 42, through the bodies of the cakes 6 from without inwardly into the interior cake chambers 41, and thence to the ports 43. In the last-described direction of circulation of the treating liquid, i. e., when the direction of liquid flow is from without the cakes 6 and inwardly thereof, a negative pressure or suction is created by the pump 8 within the interior cake chambers 41, and the pressure of the treating liquid on the exterior faces of the cakes is atmospheric due to the provision of the overflow or vent 13.

Periodically, and repeatedly, the direction of liquid flow through the system is reversed, either by hand, or by automatically operated mechanism which will now be described. Secured to the head 76 of the plug for the four-way valve 68 is one end of a crank arm 77 whose other end is pivotally connected to one end of a link 78 whose other end is pivotally connected by a crank pin 78' to a disk 79 rotatably mounted upon a worm-gear shaft 83 mounted in the housing 106 of a worm-gear shaft reducer 82. The shaft 81 of a motor 9 engages the worm shaft of the reducer 82. The periphery of the disk 79 is formed with a pair of slots 80. Referring particularly to Figure 4a, a main three-phase alternating current electrical line 87 is controlled by a main switch 88 to close a circuit 97 to a motor 89 whose shaft 89' engages a worm-gear speed reducer 90 within whose housing is mounted a worm-gear shaft 91. Secured to the shaft 91 is a sprocket 92 over which runs an endless chain 93 some of whose links are indicated by the number "93'". Secured to the chain 93 are a plurality of trips 94 adapted in sequence and at predetermined intervals of time, determined by the speed of the chain and the spacing of the trips on the chain, to engage and lift a spring-controlled arm 96 against the resistance of its spring, resulting in the closing of a circuit 98 through the closing of a switch 95, the circuit 98 running to the motor 9. Connected to the circuits 97 and 98 upon opposite sides of a switch 84 is a third circuit 99 controlled by said switch 84, the latter being adapted to be closed when a spring-actuated arm 85 secured thereto is lifted against the resistance of its spring by the riding of a roller 86 out of one of the grooves 80 formed in the periphery of the disk 79 as the latter is turned through the instrumentality of the motor 9.

When the switch 88 is closed to permit the current to flow from the main line 87 to the circuit 97, the consequent action of the motor 89 results in the movement of the chain 93 in a counter-clockwise direction causing a trip 94 to engage the arm 96 to lift the same and effect the closing of the circuit 98 which results in the actuation of the motor 9 to effect the turning of the disk 79. When this disk 79 is turned sufficiently to cause the roller 86 to ride out of the groove 80, assuming that the apparatus is in the position shown in Figures 4 and 4a, the switch 84 is closed, and, although the mechanism is so timed that by this time the trip 94 has passed the arm 96 so as to result in the opening of the circuit 98, the motor 9 still continues to be actuated through the closing of the circuit 99 incident to the closing of the switch 84. Therefore, the motor 9 is actuated continuously until the roller 86 is in the other of the slots 80, under which circumstances both the switches 95 and 84 are opened. The period of time from the instant in which a trip 94 engages the arm 96 until the roller 86 drops into the alternate groove 80 is the time allowed for the fairly leisurely movement of the crank arm 77 and link 78 from one position to their other position, to effect a reversal of liquid circulation through the four-way valve 68, as indicated by the full line and dotted line positions of the members 77, 78, and 78', Figure 4.

The next reversing movement of the crank arm 77 and link 78 commences when the next trip 94 engages the arm 96 and closes the circuit 98 to the motor 9.

When it is desired to change the timing, so as to effect the reversals of liquid flow at different intervals, the spacing of the trips 94 on the chain 93 is altered by adding or removing individual links 93' or trips 94, thus effecting the tripping of the arm 96 at different length intervals of time.

Referring particularly to Figures 14, 15, 16, and 17, there is therein disclosed an improved metallic skeleton cake insert 10 comprised of two split end rings 111 connected by spaced bars 112. Referring to Figure 14, it will be noted that the bars 112 are somewhat longer than the depth of the cake 6 so that the latter can be mounted between adjacent flanges 32' of the spacers 32 and the insert 10 mounted between the body portions of adjacent spacers 32. In order to protect those portions of the metal insert 10 which are subject to corrosion by the treating liquid or by the alkali and acids contained in and on the thread of the cakes 6, I cover substantially the full length of the bars 112 with split rubber sheaths 113. I show four of the bars 112 spaced ninety (90) degrees apart, and thus the insert openings between adjacent bars 112 are of substantial size and form in effect open longitudinal windows through which substantial portions of the cake 6 may pass under the influence of the treating liquid. Actually, during the treating operation the cake portions pulsate in and out through the several windows. Two or three of the bars 112 might be used, or a number thereof greater than four, provided windows of large enough size are provided to permit cake portions to pulsate.

When the treating liquid is passed from the chamber 41 within the interior of a cake 6 through the wall of the cake and to that chamber 42 which is exterior of the cake 6 but is within the treating casing 3, the cake 6 substantially maintains its initial collected shape, shown in Figure 15, or tends to reestablish itself in that shape, due to the character of the spinning thereof and the manner of winding the several strands of which the cake is comprised. However, when the treating liquid is passed from without the cake and through the body thereof into the interior chamber 41, the cake is deformed substantially as shown by the convex inner face portions 114 and the concave outer face portions 115, Figure 16, or tends to be so deformed, each deformed face portion extending substantially from a projection of the cake radius which passes through one of the bars 112 to the projection of the cake radius passing through the next adjacent bar 112. The ends of these deformed cake portions are adjusted somewhat outwardly, as clearly shown in Figure 16, while the intermediate part thereof is moved inwardly by the action of the treating liquid. These deformed faces 114 and 115 are wavy or irregular as suggested by the numbers "116", Figure 16. The plane of the section of the insert and package, shown in Figures 15 and 16, is considered to be a transverse plane, and the several deformed package portions in this plane in Figure 16 are considered to be relatively transversely or laterally positioned, so that the relatively transversely adjacent portions of the package are deformed in opposite directions under the action of the treating liquid. In Figure 16, there are four package portions which have been moved inwardly of the package axis by the inward movement of the treating liquid, and four alternate package portions, viz., those package portions exteriorly adjacent to the bars 113 which have been moved somewhat outwardly during the inward movement of the treating liquid. These inward and outward movements of adjacent package portions are clearly shown in dotted lines in Figures 23 and 29.

It is evident that the contractibility incident to the split ring formation of the end rings 111 of the cake insert 10 provides for the convenient and non-damaging insertion of the insert 10 into the cake 6, for the mounting of the cake for the treatment thereof, the insert 10 being permitted to expand when completely inserted within the cake 6, so that the spaced rubber-covered bars 112 thereof contact with the inner face of the cake, as clearly seen in Figure 15. During the liquid treatment the inserts 10 are held substantially rigid by the spacers 32, bases 31 and caps 33.

Referring particularly to Figures 18, 19, 20, and 21, I show therein a modified form of cake insert preferably formed of wire and having a plurality of spaced longitudinal wire fingers 128 provided with split rubber sheaths 129. The fingers 128 are formed with interior longitudinally-extending portions 130 each connected by an upper-end U-joint 132 with an interiorly-located stop member 131 of elongated U-formation. These stop members 131 in turn are connected at the top by outwardly-extended U-shaped joints 133 with the respectively adjacent fingers 128. When this form of insert is utilized as a mounting for the cakes 6, the split rubber sheaths 129 contact the inner face of the cake 6 at spaced intervals, and the outwardly-extended U-portions 132 and 133 at the upper end of the insert overlie the top face of the cake 6, Figure 19. The respective positions assumed by the different cake portions, or tended to be assumed, when the pressure of the treating liquid is from without inwardly is indicated by the inside face 134 of the cake 6 and the outside face 135, Figure 21, both of which faces are of irregular outline. The members 131 serve to define the maximum possible amount of inward movements of the several cake portions under the action of a treating liquid applied to the outer face of the cake 6.

Regardless of the pipes and other liquid flow apparatus, the difference in pressures between the inside and outside of the packages 6 is balanced. Of course, the pressure on that side of the package 6 facing the intake of the pump 8 will be a negative one, i. e., one below atmospheric pressure, and, when the flow of treating liquid is from without the packages inwardly, the pressure on the outside of the packages 6 is atmospheric because of the overflow or vent 13 at the top of the treating chamber 3, as hereinbefore explained. The pressure at which the treating liquid is fed to the packages 6 can be varied to conform to the different desired effects from different treating liquids, and to conform to the different characteristics of packages made in different ways. The effective work done by the treating liquid is uniform on all cakes 6 of a vertical tier of cakes, regardless of the height of the tier, the formation of any substantial differential effect tending to arise from any hydrostatic head being obviated by reason of the provision of the overflow 13.

Referring particularly to the bobbin type of support, Figures 22, 23, 24 and 25, which is utilized for wound rayon packages of spool or bobbin shape, the same comprises a pair of end rings 142 connected by a plurality of spaced longitudinal bars 143 having split rubber sheaths 144. The position assumed by the wound bobbin 7 mounted on the bobbin 10', or tended to be assumed, when the pressure of the treating liquid is from without inwardly, is shown in dot-and-dash lines, Figure 23, wherein "145" indicates the inner face of the wound bobbin 7 and "146" indicates the outer face thereof, both of irregular outline, this Figure 23 clearly showing the inwardly-moved intermediate part of each deformed cake portion and the somewhat outwardly adjusted ends thereof. The shape in which the wound bobbin is spun is shown in full lines in said Figure 23. The bobbin type of package 7 is formed with tapered ends 7', as is clearly shown in Figure 22, and as is well-known in the art. Therefore, I make the flanges 141 of the spacers 140 also of tapered formation to conform to the ends 7' of the wound bobbin 7, and thus cause the end faces 7' and the adjacent faces of the flanges 141 closely to contact one with the other throughout the entire distance wherein they are in vertical alignment.

Referring to the apparatus shown in Figures 26 and 27, I therein illustrate an attachment for the bobbin-supporting and rotating spindle of a spinning machine which will permit the spinning of a wound bobbin upon a perforated support, without destroying the desired cylindrical formation of the wound bobbin, upon which perforated bobbin or support the newly collected wound bobbin package can be subsequently processed in situ. In other words, I provide an attachment for covering the open spaces of the support or bobbin 10' while spinning the wound bobbin from the precipitating bath on such bobbin. To the bobbin-rotating spindle 148 of a spinning machine I secure hub member 147 by means of a set screw 149, the member 147 being formed with an axial recess 150. Formed upon the outer surface of the hub member 147 are a plurality of spaced ears 151 to which are pivotally secured by means of pins 152 a plurality of spaced arms 153 having hub portions 154 mounted on the pins 152, which hub portions 154 are formed with heels 154' in contact with the outer surface of the hub member 147. Each of the supporting arms 153 has an arcuate wound-bobbin-supporting plate 155 of a peripheral width slightly less than the arc between contiguous bobbin bars 143 of the circle defined by such bars 143, these wound-bobbin-supporting plates 155 having end extensions 156 adapted to contact at their outer surfaces with the inner surface of one of the bobbin end rings 142. Extended inwardly from the center of the wound-bobbin-supporting plates 155 are radial webs 157 having inner end clamping pad portions 158. These pad portions 158 define a circle having an area substantially equal to the cross-sectional area of a spreading head 160 having a conical portion 160' and formed upon a rod 159 having a handle 162 at one end and an extension 161 at the other end adapted to engage the recess 150 in the hub member 147. Outward movement of the rod 159 is limited by an enlarged shoulder portion 174 adapted to contact the inner ends of the pads 158.

A rubber band 173 tends to hold the arms 153 compressed so as to prevent the lowermost arms from falling outwardly when there is no bobbin or support on the spinning machine. The arms 153 are prevented from falling inwardly by reason of the contact of the heel members 154' with the outer surface of the hub member 147.

When it is desired to spin a rayon bobbin 7 upon a bobbin or support 10' and upon the spindle of a spinning machine having my improved attachment, the bobbin 10' is applied to the attachment, which is fixed to the spinning machine spindle, in the following manner. The bobbin 10' is passed over the arms 153 of the attachment with the bars 143 of the bobbin passing between the adjacent edges of adjacent wound-bobbin-supporting plates 155, as shown in Figure 27, and the end extensions 156 of the plates 155 passing through one end ring 142 of the bobbin 10', as shown in Figure 26. Meanwhile, the inner extension 161 of the rod 159 has been positioned in its innermost position in the recess 150 of the hub member 147. This rod 159 is then pulled outwardly by means of the handle member 162, the conical head portion 160' facilitating the entrance of the head 160 within the circle defined by the clamping plates 158, the outward movement of the rod 159 being continued until the shoulder 174 engages the inner ends of the clamping plates 158, as clearly shown in Figure 26. Thus the pads 158 are tightened so as to position the wound-bobbin-supporting plates 155 substantially in the circle defined by the rubber sheaths 144 of the bobbin bars 143, which is the circle that it is desired to define by the inner face of the wound bobbin 7 when it is gathered or spun.

As will be clearly seen in Figures 27 and 30, the plates 155 and 168, respectively, do not fill the entire collecting surface portions between the adjacent bars 143 and 164, but do complete the collecting surface to an extent sufficient to make a continuous collecting surface from a practicable standpoint. In other words, the comparatively slight spaces between the edges of the plates 155 and 168 and the adjacent bars 143 and 164 are not large enough to prevent the collection of the wound bobbin with substantially cylindrical inner and outer faces.

Referring to the form of bobbin 10' shown in Figures 28, 29, and 30, the same comprises a pair of end rings 163 connected by a plurality of spaced longitudinal rods 164 covered with split rubber sheaths 165. In this form of bobbin, I provide spaced stops 166 intermediate each adjacent pair of longitudinal rods 164, these stops lying interiorly within the circle defined by the rods 164 and serving to limit the amount of inward movement made by the wound bobbin when the pressure of the treating liquid is from without inwardly, as indicated by the inner face 169, Figure 29, which face indicates the position assumed by this face of the wound bobbin, or tended to be assumed, under such liquid pressure. The outer face of the wound bobbin when the pressure of the treating liquid is from without inwardly is indicated by the number "170", and both the inner and outer faces are irregular in outline. I indicate in Figure 30 some necessary changes in the structure of the bobbin attachment for the spinning spindle, when the bobbin 10' is provided with stops, such as the stops 166 shown in Figures 28 and 29. Under such conditions, the wound-bobbin-supporting plates 155 of Figures 26 and 27 are subdivided into a pair of arcuate plates 168, each of which is connected to the clamping pad 158 by means of an end web 167.

Important advantages attach to the spinning of the rayon packages of bobbin formation upon bobbins which are of such constructions that they can also be used as supports, after spinning, for the necessary purification and other processing. It is necessary with previous types of bobbins to unwind the rayon package from the bobbin and rewind into other package forms, after washing, and before subsequent processing, and in so doing, the rayon fibres are damaged, and other injurious results occasioned. If the rayon package upon the previous types of bobbin is not so rewound, the benefits of the inward shrinkage of the package obtained by my improved process cannot be realized. My improved attachments for the wound-bobbin-supporting shafts of spinning machines permit proper collection of the rayon bobbins upon perforated bobbins which then serve as suitable supports upon which the wound rayon bobbins remain mounted for subsequent processing.

Referring particularly to Figure 31, I therein show a fragmentary portion of a treatment casing 3 in which is mounted a vertical tier of rayon cakes 6, the top of each of which is spaced from the bottom of the adjacently upper spacer flange 32', as indicated by the number "171". The cakes 6 shown in this Figure 31 are assembled preliminary to the first washing operation, and are freshly spun, and in the tender or gel state, before they have been aged or hardened to any extent, except that the thread of the entire cake has been given time within which to be fully set up.

A method of treating rayon threads in tubular package form, when the thread is in a tender state, such as the gel state, is shown, described and claimed in United States Patent No. 1,859,037, issued May 17, 1932, upon my improvements in Methods of treating fine filamentous thread in package form. The method disclosed in said patent consists essentially in mounting the freshly spun cakes in vertical tiers between spacers, and with a slight space separating the top of each cake from the adjacently upper spacer flange, before commencement of the treating operation, so that the cake, during the early stages of the treating operation, may elongate longitudinally until its upper end strikes the spacer abutment above, and then the cake is restrained from further elongation. This limited elongation of the cake induces porosity inasmuch as the space initially above the cake somewhat alleviates, during the elongating period, the pressure which, if there were no such space, would tend to be built up by the resistance which the cake body offers during such period to the passage of the treating liquid therethrough.

Whether or not the rayon packages tend to elongate longitudinally during the early stages of treatment with a processing liquid, and the extent and rapidity of such elongation, depends materially upon the time which elapses between the collecting of the package by the spinning machine and the first liquid operation. The tendency to so elongate decreases as this period of time increases. Therefore, when the cakes which are being processed are freshly spun, or in a tender or gel state, this tendency to elongate longitudinally is most pronounced. When fresh cakes are processed by the new method disclosed in this instant application, it is of advantage to provide for this longitudinal elongation of the package, in order to thus assist in inducing the desired porosity, as well as the inducing of porosity by the lateral pulsating of the package herein shown, described and claimed.

The spaces 171 shown in the instant application, Figure 31, are materially deeper than those shown in said patent, but may or may not be as deep as the total elongation which the package tends to make under the treatment, depending upon the desired permissible amount of longitudinal elongation of the package. I have shown spaces 171 of substantially one-half (½) inch depth, and the same may vary from a substantial depth up to a depth of approximately one (1) inch.

The inserts 175, Figure 31, are longer than the inserts 10, Figure 14, in order to space apart the spacers 32 sufficiently to provide the spaces 171 above the cakes 6.

After the cakes 6 shown in said Figure 31 have elongated under the liquid treatment until they completely fill the spaces 171 between adjacent flanges 32' of adjacent spacers 32, or until they have completed their longitudinal elongation, their processing continues by lateral pulsations under the influence of the pressure of the treating liquid in the same manner as described with reference to the cakes shown in Figure 14. Of course, the processing by lateral pulsations is also effected during the elongating period.

In Figure 32, I have disclosed an assembly of rayon packages of wound bobbin form in a treatment casing 3, in which the upper end of each wound bobbin 7 is separated from the lower flange 141 of the adjacently upper spacer 140 by a space 172, similar to the space 171 shown and described relative to Figure 31. This space 172 is for the same purpose, and used under the same conditions as that described relative to the space 171, Figure 31, and after the wound bobbins 7 have longitudinally elongated sufficiently to fill the spaces 172, or have completed their longitudinal elongation, the processing of the bobbins by the treating liquid continues in the manner described with reference to the bobbin assembly shown in Figure 22. In Figure 32, the inserts 176 are longer than the inserts 10', Figure 22, in order to space apart the abutments 140 sufficiently to provide the spaces 172 above the wound bobbins 7. A hard rubber cap 177 surmounts the tier of wound bobbins 7.

Preferably, the depth of the spaces 171 or 172 is coordinated with the amount of permissible lateral deformation of the rayon package so as to produce a desired amount of longitudinal elongation of the package relative to the amount of inward and outward lateral pulsating movements of the latter.

After the rayon packages have been completely processed by the method herein disclosed, they can be dried in the treatment casing 3 by circulating air therethrough and while still mounted upon the inserts 10 and 175, or the bobbins 10' and 176. It is not necessary to incur the additional expense of transferring the packages to a special extractor or dryer, for the purpose of drying the same preliminarily to the disposal thereof for ultimate use and sale, or to the rewinding thereof into other package forms for such disposal. Furthermore, the danger of injuring the packages by rewinding and by and during the transfer to an extractor or dryer is thus eliminated. One drying of the processed package, treated by the various purifying liquids by my improved method, is sufficient to result in even shrinkage of the thread, it not being necessary to again or repeatedly rewet the package and alternately dry the same to obtain satisfactorily uniform shrinkage conditions.

The pulsating of the package which is occasioned by my improved method of processing, and the consequent porosity of the package, give all portions of the latter full opportunity to contract when drying, in accordance with their several tendencies, without occasioning any strain in any portion of the package. By "pulsating" I mean the inwardly and outwardly to and fro movements made by the package and the constituent parts thereof.

The treating liquid which I provide adjacent both faces of the package tends to make the package become buoyant and to tend to float so that under the liquid treatment it switches back and forth similar to the movements of skein packages when the latter are treated with liquids in the manner well-known to those skilled in the art. By "float" is meant a movement of the package in the treating liquid induced and maintained by the pressure and directions of movement of the treating liquid, limited only by the nature of the package strand and by the stops which prevent any inward package movement in excess of the predetermined desired maximum inward movement.

Although it is not necessary so to work my improved method of processing rayon packages, I prefer to cause the last direction of flow of the treating liquid to be from without the packages inwardly, so that the last shape and condition of the package, before drying the latter, is a deformed and highly slack one, and thus the drying may be effected under the most advantageous circumstances for obtaining uniform contraction, during drying, of all parts of the package.

My improved forms of inserts and bobbins are also adaptable to the well-known drip-washing of rayon packages. The cakes or wound bobbins mounted on the inserts or bobbins may or may not be rotated while water is permitted to drip over the cakes or wound bobbins. Preferably, the inserts or bobbins are supported between spacers held in position similar to the stacking arrangement of the cakes and inserts, and wound bobbins and bobbins, shown in Figures 14 and 22, respectively. Furthermore, in lieu of the drip method, the treating liquid can be applied to the rayon packages mounted on my improved inserts and bobbins and stacked as shown in Figures 14 and 22, through a perforated tubular pipe located within the stack, the liquid being applied without pressure, thus loosening up the package and inducing inner movement thereof.

When spinning wound bobbin packages, the thread is gathered untwisted, and therefore it is necessary subsequently to twist the thread on a separate machine known as a "twister" or a "spinner". I wish to point out that the elongated windows of my improved forms of bobbin do not offer resistance to free twisting, since the bobbin with the wound rayon bobbin mounted on it is revolved at a high speed during the twisting operation causing the cross-sectional shape of the wound bobbin package to take a form similar to that which it assumes, or tends to assume, when it is subjected by my improved process to the action of a treating liquid moving from within the package outwardly. Since the rayon thread is dry when being twisted, no unequal strains such as my improved process seeks to eliminate are set up by the centrifugal action.

What I claim is:

1. A process of treating a thread of fine filamentous character in tubular package form consisting in subjecting the package while in the gel state to the action of a treating liquid applied under pressure to the inner and outer faces of the package alternately while the package is mounted so that the package as a whole is free to elongate longitudinally to a predetermined extent under the action of the treating liquid and transversely spaced portions of the package are free to move inwardly to a predetermined extent under the pressure of liquid applied to the outer face of the package while the other portions of the package are restrained from inward movement, the permissible maximum amount of longitudinal elongation being coordinated with the permissible maximum amount of inward movement.

2. A process of treating a thread of fine filamentous character in tubular package form consisting in differentially pulsating adjacent portions of the package toward and from the package axis by a liquid passed into the package under pressure, and at the interior and exterior faces thereof alternately, the final liquid application being at the exterior face of the package.

3. A process of treating a thread of fine filamentous character in annular package form consisting in assembling the package on a support of substantially constant radial dimension having spaced openings of a character to allow substantial-sized spaced portions of the package to move inwardly of the support under pressure, and then pulsating the package on the insert by the action of a treating liquid.

4. A process of treating a thread of fine filamentous character in symmetrical tubular package form consisting in differently deforming adjacent portions of the package by the action of a treating liquid applied thereto, and then causing the package to tend to reestablish itself in a symmetrical tubular form by the action of a treating liquid.

5. A process of treating a thread of fine filamentous character in tubular package form consisting in assembling a plurality of packages in a substantially vertical tier and then pulsating different portions of each package concurrently in different directions in, and by the action of, a treating liquid applied under pressure to the inner and outer faces of the packages alternately, while preventing the formation of any substantial differential in the difference in pressures between the inner and outer faces of the several packages, which would tend to be created by any hydrostatic head.

6. A process of treating a thread of fine filamentous character in tubular package form consisting in assembling a plurality of packages in a substantially vertical tier in an enclosing vessel having an overflow for that part of the vessel chamber exteriorly of the package tier, said overflow being located above the level of the top of the package tier, and then pulsating different portions of each package concurrently in different directions in, and by the action of, a treating liquid applied under pressure to the inner and outer faces of the packages alternately, the liquid being passed into and out from the vessel below the level of the bottom of the package tier.

7. A process of treating a thread of fine filamentous character in tubular package form consisting in subjecting the package to the action of a treating liquid applied under pressure to the inner and outer faces of the package alternately while supporting the package so that transversely adjacent portions thereof can float concurrently in opposite radial directions in, and under the action of, the treating liquid, while positively limiting the maximum permissible extent of inward movements and permitting the extent of outward movements to be controlled by the nature of the package strands.

8. A process of treating a thread of fine filamentous character in tubular package form consisting in differentially pulsating adjacent portions of the package toward and from the package axis by a liquid passed into the package under pressure, and at the interior and exterior faces thereof alternately.

9. In apparatus for liquid-treating tubular packages of thread of fine filamentous character, an insert for a plurality of packages assembled in a longitudinally-aligned tier consisting of a rigid body structure permitting liquid communication between the interiors of adjacent packages when the latter are assembled thereon, said structure being formed with longitudinally spaced elongated openings and transversely spaced elongated openings, through which openings spaced portions of assembled packages may move relatively to the structure, said structure being constructed to permit liquid communication between the exterior and interior of the structure in addition to such communication permitted through said openings, and stop members adapted to limit the movements of the package portions through said openings to a predetermined maximum.

10. In apparatus for liquid-treating tubular packages of thread of fine filamentous character, an insert for a plurality of spaced packages assembled in a longitudinally-aligned tier consisting of a rigid body structure permitting liquid communication between the interiors of adjacent packages when the latter are assembled thereon, said structure having spaced transverse members adapted respectively to engage the opposed ends of adjacent packages and longitudinal members adapted to engage the interior faces of the packages, the longitudinal members of the structure being formed with longitudinally spaced elongated openings and transversely spaced elongated openings, through which openings spaced portions of assembled packages may pulsate and may move relatively to the structure, said structure being constructed to permit liquid communication between the exterior and interior of the structure in addition to such communication permitted through said openings, and stop members disposed interiorly of, and opposite to, said openings and adapted to limit the inward movements of the package portions through said openings to a predetermined maximum.

11. In apparatus for liquid-treating tubular packages of thread of fine filamentous character, an insert for a plurality of spaced packages assembled in a longitudinally-aligned tier consisting of a rigid body structure permitting liquid communication between the interiors of adjacent packages when the latter are assembled thereon, said structure having spaced transverse members adapted respectively to engage the opposed ends of adjacent packages and longitudinal members adapted to engage the interior faces of the packages, said longitudinal members spacing adjacent transverse members a distance apart greater than the length of a package before liquid treatment, said longitudinal members being formed with longitudinally spaced elongated openings and transversely spaced elongated openings, through which openings transversely spaced portions of assembled packages may move relatively to the structure, said structure being constructed to permit liquid communication between the exterior and interior of the structure in addition to such communication permitted through said openings and through the spaces between said transverse members and the adjacent ends of the respective packages, and stop members adapted to limit the movements of the package portions through said openings to a predetermined maximum.

CHARLES A. HUTTINGER.